July 9, 1940.  F. M. FLOYD  2,207,398
SEISMIC SURVEYING
Filed Feb. 7, 1938   2 Sheets-Sheet 1

Inventor
FRANCIS M. FLOYD
By Jesse R. Stone
&  Lester B. Clark
Attorneys

July 9, 1940.   F. M. FLOYD   2,207,398
SEISMIC SURVEYING
Filed Feb. 7, 1938   2 Sheets-Sheet 2

Inventor
FRANCIS M. FLOYD
Jesse R. Stone
Lester B. Clark
By
Attorneys

Patented July 9, 1940

2,207,398

UNITED STATES PATENT OFFICE 2,207,398

SEISMIC SURVEYING

Francis M. Floyd, Houston, Tex., assignor to F. M. Kannenstine, Houston, Tex.

Application February 7, 1938, Serial No. 189,045

4 Claims. (Cl. 181—0.5)

The invention relates to geophysical exploration and more particularly to the method and apparatus for determining geological sub-surface structure by using artificial seismic waves generated in the earth.

In the seismic method of prospecting, elastic waves are set up in the earth and received and recorded at a point distant from the point of origin. These waves are set up in any suitable manner, as by a charge of dynamite exploded at or near the surface of the earth, and spread out from the source point in all directions and are reflected and refracted by the various sub-surface strata. At a distance from the source a recorder is placed to receive and record the vibrations after their passage through the earth. From the records so obtained inferences may be drawn as to the location and nature of sub-surface structures as indications of the location of oil, gas and related deposits.

The waves passing through the earth encompass a broad band of frequencies from very low frequencies to frequencies which are much higher than can be usably recorded. These composite waves are attenuated in their passage through the earth by an amount which depends upon the distance of travel. At the same time the higher frequency components are more attenuated than are the low frequency components. It is, therefore, apparent that reflections from shallow beds may have sufficiently high frequency energy to produce a usable wave trace, while for deeper reflecting beds or layers only the low frequency energy has sufficient amplitude to produce a usable wave trace.

The first waves to arrive at a receiving station are of high amplitude and when the recording equipment is adjusted for satisfactorily recording such waves, the later arriving waves are of insufficient amplitude to produce a satisfactory wave trace and hence a material amount of information is lost. On the other hand, if the adjustment of the recording equipment is such that the deeper reflections are properly recorded, the earlier part of the record is of such great amplitude that desired information is obscured thereby. It is therefore desirable to provide such equipment and procedure that all phases of the vibratory event will be recorded at a usable amplitude. Furthermore, as the resolving power, or ability to separate the reflected impulses from closely adjacent beds, depends upon the frequencies selected for recording, it is also desirable to selectively record at the highest possible frequency that will give a sufficient amplitude of wave trace.

An object of the invention is to provide a method of geophysical exploration in which the recording at each instant is affected by a band of frequencies which for that instant give a maximum of information relative to sub-surface structure.

It is also an object to provide method and apparatus in which the record of a seismic event is produced at the highest frequency that provides sufficient energy to produce a usable wave trace.

Another object is the provision of means for changing the frequency characteristic of recording equipment so that the relatively high frequencies transmitted by the seismic pickup will be the principal source of energy in producing a wave trace.

Still another object is to provide means having an initial low frequency cutoff followed by a changing frequency characteristic which is such that the highest recordable frequencies are thereafter utilized in producing a trace which is indicative of sub-surface structure.

Still another object is to provide method and apparatus for recording a seismic event at the highest recordable frequency for each instant of the event and for producing a record which is of substantially constant amplitude.

Other objects together with the foregoing will be apparent from the following description taken in connection with the accompanying drawings in which.

Figure 1:
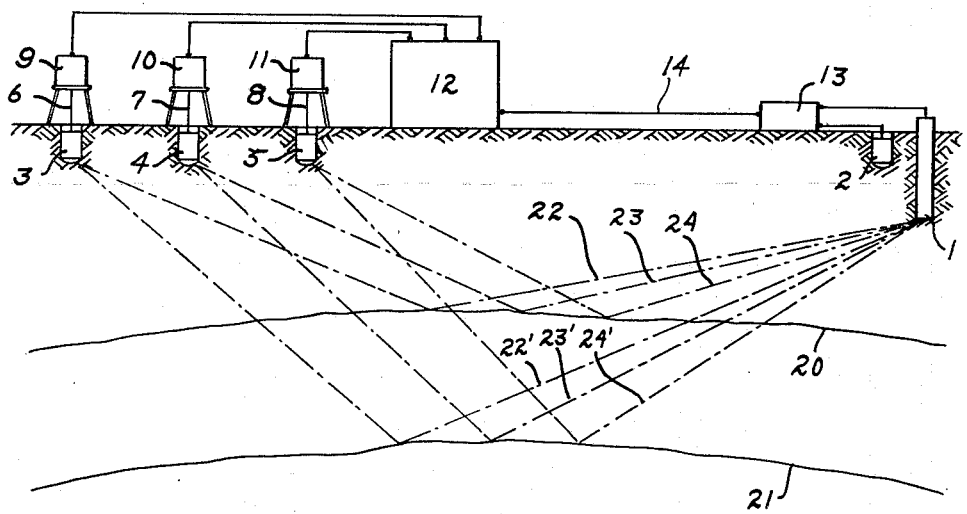
Fig. 1 is a diagram of the system whereby the method of the invention is practiced.

In the arrangement illustrated in Fig. 1 the numeral 1 indicates a source of seismic waves, 2 indicates the shot or sound pickup actuated at the instant of initiation of the seismic waves. Pickups or geophones 3, 4 and 5 receive the energy of the impulses transmitted through the earth from the source 1 and translate this energy into electric impulses for transmission through conductors 6, 7 and 8 to amplifiers 9, 10 and 11, whence the amplified impulses are conducted to a suitable recording mechanism 12 as is well known in the art.

The blaster or detonating device 13 sets off the instrumentality such as dynamite which serves as the source 1 and a connection 14 is provided from the shot or sound pickup 2 through the blaster 13 to the recording mechanism 12 so that a suitable record of the time of initiation of the seismic waves may be recorded.

The elastic waves generated in the earth by the source 1 travel outwardly in all directions and strike sub-surface layers 20 and 21, the normals to the wave fronts reflected from the layer 20 to pickups 3, 4 and 5, being indicated by the lines 22, 23 and 24 respectively. The reflections from the layer 21 are similarly identified by primed numerals.

Figure 2:
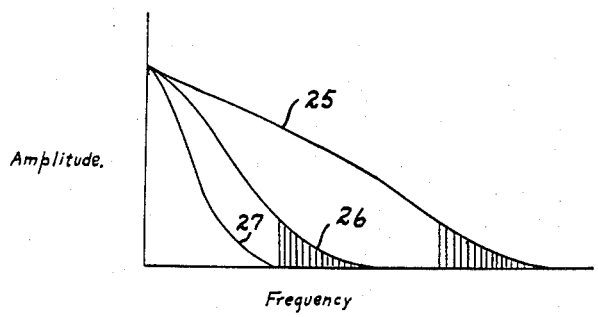
Fig. 2 is a graphical illustration showing the frequency composition of waves that are reflected from geological beds at different depths.

As above pointed out the waves passing through the earth from the source 1 encompass a broad band of frequencies, the higher frequencies being more attenuated during their passage through the earth than are the lower frequencies. This condition is illustrated in Fig. 2, wherein the ordinate represents amplitude and the abscissa represents frequency. These curves represent the relative amplitudes in the band or continuous spectrum of impulses generated in the earth. The energy available for producing a desired record is dependent upon the width of the frequency band and the portion of the impulse spectrum recorded, and such energy is substantially proportional to the area under the curves and within the portion of the impulse spectrum which is utilized. Such area is indicated by shading under the curves 25 and 26 in Fig. 2. Curve 25 represents the energy distribution in impulses which are reflected from shallow structures or reflecting beds. As the higher frequencies suffer but little attenuation under such circumstances, it is to be noted that the total energy available for producing a record is relatively large and contains a considerable amount of high frequency energy.

Curve 26 represents the energy distribution in impulses reflected from structures of medium depth, while curve 27 similarly illustrates the energy distribution in waves that are reflected from beds or reflecting layers at a considerable depth. From the graphical illustration of Fig. 2, representing actual conditions, it is apparent that for low frequencies the energy distribution is substantially constant, whereas, the high frequency energy is rapidly attenuated as the distance of travel increases. Since the higher frequency energy gives greater information, it is therefore apparent that in order to desirable use such energy, it is necessary to provide method and equipment such that the energy represented by the shaded portions of Fig. 2 is instrumental in producing the record which is to be interpreted for determination of sub-surface structures. These shaded portions are shown only in connection with curves 25 and 26 for correlation with conditions illustrated in Fig. 1, curve 25 being used as illustrative of waves reflected from layer 20 and curve 26 as illustrative of reflection from the layer 21.

Figure 3:
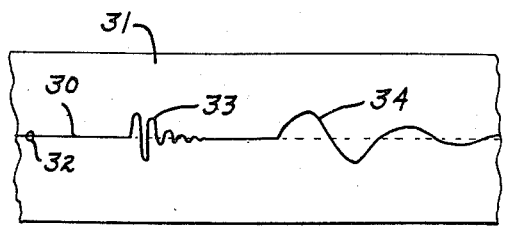
Fig. 3 represents a wave trace obtained in accordance with the invention.

While in practice it is customary to record the impulses from all of the pickups in parallel relation upon a single strip, Fig. 3 illustrates a single trace 30 made in accordance with the present invention upon a recording strip 31. The impulses from the shot or sound pickup 2 is indicated as recorded at 32, while the reflection from layer 20 is indicated by the trace 33. The later reflection from the layer 21 is indicated as trace 34. It is to be noted that these traces are of substantially the same amplitude and that also the wave trace 33 is a high frequency trace which quickly dies away before the beginning of lower frequency trace 34. These features are important in the present invention and give rise not only to traces of usable amplitude but also to greater resolving power or ability to distinguish closely adjacent sub-surface beds.

Figure 4:
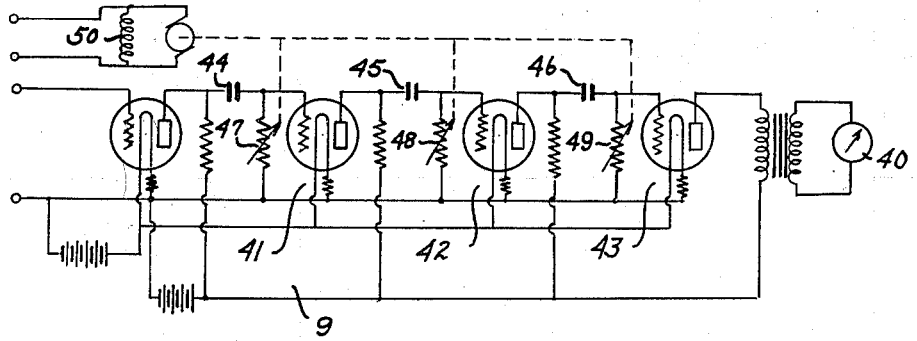
Fig. 4 is a diagram showing an arrangement capable of carrying out the method of the invention.

In order to more clearly understand the invention and to realize the advantages thereof, attention is further directed to Fig. 4 which illustrates one construction for obtaining desired results. This figure illustrates one of the amplifiers, 9, to which is connected a recording galvanometer or the oscillograph 40. The amplifier 9 as illustrated is a conventional resistance coupled amplifier having three stages of amplification indicated generally as 41, 42 and 43. The frequency response characteristic of the amplifier 9 is determined by the values of the condensers 44, 45 and 46 and/or the resistors 47, 48 and 49, and hence this characteristic or the frequency response of the amplifier may be varied by changing either or both of these elements. In accordance with the diagram it is suggested that the resistors 47, 48 and 49 may be made variable, preferably of the rotary arm type, the rotors being coupled together as is well known so as to be moved as a unit. The composite rotor as above described is connected to a suitable motor 50. It is preferable that the frequency response variation be automatic and with this arrangement it is intended that the amplified frequencies shall be high during the early part of the record and gradually decreased during the recording so that there shall be a substantially constant amplitude of the wave trace. At the same time it is contemplated that at each instant of the recording interval the maximum frequency giving a suitable amplitude of wave trace shall be utilized. To accomplish this result the motor 50 is energized from any suitable source and may be started manually or by means of an impulse from the shot point pickup 2. It is also to be understood that the motor 50 may, if desired, be any suitable type of motor other than electric and that furthermore the particular manner of varying the frequency characteristic may be other than that just given.

Since it may be desirable to utilize the time of the first arrival of energy for purposes of computation, it may be deemed desirable to have the initial frequency characteristic flat and pass a relatively wide band of frequencies, particularly low frequencies, in order that the break from the zero line be as distinct as possible. Immediately thereafter, however, it is preferable that the frequency characteristic be changed to pass relatively high frequencies only, the frequency band being lowered until the end of the record is reached. This result may be obtained in accordance with the system illustrated in Fig. 5 which is identical to that shown in Fig. 4 except that the resistors 47, 48 and 49 are composite and have sections 57, 58 and 59 which may be short circuited by means of a multi-contact relay designated as 60 and energized from a source connected to the terminals 61. The circuit which energizes the relay 60 may also energize the relay 62 to initiate the operation of the motor 50.

Figure 5:
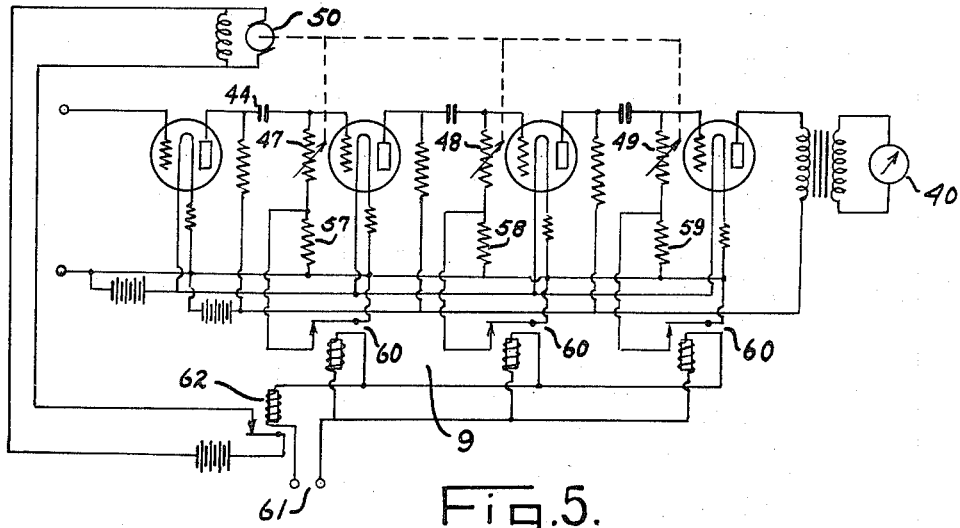
Fig. 5 is a diagram showing a modified form which is capable of carrying out the method of the invention.
Figures 6, 7:
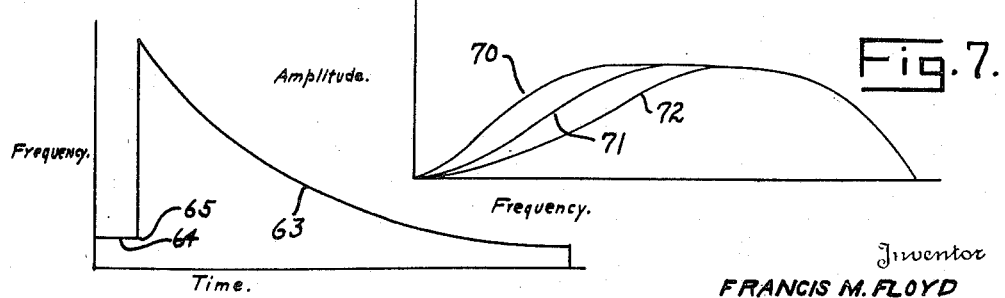
Fig. 6 is a graphical illustration of the frequency-response characteristic of the arrangement illustrated in Fig. 5.
Fig. 7 is a graphical illustration of the geophone, amplifier and galvanometer characteristics when practicing the invention.

In the embodiment illustrated in Fig. 5 the variable resistors 47, 48 and 49 are initially adjusted to a low value. Prior to the closure of the multi-contact relay 60 relatively low frequencies are amplified. This is illustrated by the portion 64 of the frequency-time curve shown in Fig. 6. At the point 65 the relay 60 closes and the amplifier will then pass only the higher frequencies. The motor 50 also starts at this instant and thereafter the frequency characteristic of the amplifier is changed by the operation of the motor 50 during the recording interval. This phase of the operation is represented by the curve 63.

The effect of the amplifier 9 as above described is modified by the electrical characteristics of the pick-up, as well as the recording mechanism which receives and records the out-put from the amplifier 9. The amplitude-frequency characteristic of the complete system is illustrated graphically in Fig. 7. In this figure the curve 72 represents the amplitude frequency characteristic of the complete system when the resistors 47, 48 and 49 are set for reception of initial incoming energy or the energy reflected from the shallower formations. The energy of the lower frequencies is suppressed so that the record produced is largely that resulting from the higher and more significant frequencies. During the course of the recording of a series of incoming signals from formations of increasing depth, the resistors 47, 48, and 49 are varied and the over-all amplitude frequency characteristic of the system varies and passes sequentially through the positions indicated by the curves 71 and 70. It is thus apparent that the system is such that increasing amounts of low frequency energy are utilized as reflections from deeper beds of reflection arrive at the recording station. This characteristic is instrumental in satisfactorily controlling the low frequency energy of the elastic waves and hence in controlling the amplitude of the record traces.

By suitably varying the frequency characteristic of the recording equipment as illustrated, the objects and advantages of the present invention are attained. Preferably such variation is automatic and generally the frequencies passed early in the recording shall be high and will be decreased during the progress of recording. The limits of variation will be determined by numerous factors, among which are the amount of explosive used and the structural nature of the area being explored. By practice of the invention as described, the amplitude of the record trace may be made essentially constant since the frequency characteristic of the system will be so varied that the amplitude of the impulses being recorded is substantially constant. At the same time the frequency at which each portion of the record is made is such as to give the highest resolving power possible.

While specific embodiments have been illustrated, the invention is not confined thereto as the disclosure is to be illustrative, modification being apparent to those skilled in the art without departing from the spirit of the invention. It has for example been proposed that the frequency characteristic of the recording equipment be varied progressively from the higher frequencies to the lower frequency during an interval of recording. It is believed obvious that the variation of the frequency characteristic may be either uniform or non-uniform and continuous or it may be discontinuous, depending upon conditions existing in a given area being explored. It is therefore intended that such modifications shall come within the scope of the appended claims and that the invention be not limited to the specific details shown and described.

What is claimed is:

1. A method of geological exploration including the steps of creating elastic waves in the earth, translating into electrical impulses the waves so created, and amplifying and recording such band of frequencies including the highest frequencies of the electrical impulses as will provide a usable amplitude of wave trace and simultaneously varying the frequency amplification characteristic to lower the lower limit of said band of frequencies so amplified as a function of the time elapsed after the arrival of the initial elastic wave.

2. In recording elastic earth vibrations, the method of securing a record which for successive moments of the period for which said vibrations persist records the vibration at an amplitude presenting maximum interpretive clarity which consists in converting said earth vibrations into electric vibrations, amplifying said electric vibrations over the period during which said vibrations persist and simultaneously changing the frequency characteristic of amplification in such a manner that during the initial part of said period the vibrations of the relatively higher frequency portion of the vibration spectrum are amplified with an amplification factor large relative to the amplification of the lower frequency portion of said spectrum, and during the terminal portion of said period the vibrations of the relatively lower frequency portion of said spectrum are amplified with an amplification factor large relative to the amplification factor with which the higher frequency portion of said spectrum is amplified, and recording the electrical vibrations so amplified.

3. In recording elastic earth vibrations, the method of securing a record which for successive moments of the period for which said vibrations persist records the vibration at an amplitude presenting maximum interpretive clarity which consists in converting said earth vibrations into electric vibrations, amplifying said electric vibrations over the period during which said vibrations persist and simultaneously changing the frequency characteristic of amplification in such a manner that starting with the initial instant of said period the amplification factor of a given frequency in the spectrum of said vibrations varies continuously as a function of the elapsed portion of said period in such a manner that over the initial portion of said period the high frequencies are amplified relatively more than the low frequencies, and that over the terminal portion of said period the low frequencies are amplified relatively more than the high frequencies, and recording the electrical vibrations so amplified.

4. In recording elastic earth vibrations, the method of securing a record which for successive moments of the period for which said vibrations persist records the vibrations at an amplitude presenting maximum interpretive clarity which consists in converting said earth vibrations into electric vibrations, amplifying said electric vibrations over the period during which said vibrations persist and simultaneously changing the frequency characteristic of amplification in such a manner that during an initial brief moment of said period the vibrations of all frequencies of the vibration spectrum are amplified with substantially the same amplification factor and that starting with the initial instant of the portion of said period remaining after said initial brief moment the amplification of a given frequency in said spectrum varies continuously as a function of the time elapsed since the initial instant of said remaining portion and in such a manner with frequency that immediately after said initial instant of said remaining portion the high frequencies are amplified substantially relatively more than the low frequencies and over the terminal part of said remaining portion the low frequencies are amplified substantially more than the high frequencies, and recording said electrical vibrations so amplified.

FRANCIS M. FLOYD.